INVENTORS.
Peter Breidt, Jr.
Lloyd E. Lefevre
BY
ATTORNEY

Feb. 10, 1970  P. BREIDT, JR., ET AL  3,494,993
EXTRUSION OF WIDE THERMOPLASTIC FILM AND SHEET
Filed Jan. 29, 1968  2 Sheets-Sheet 2
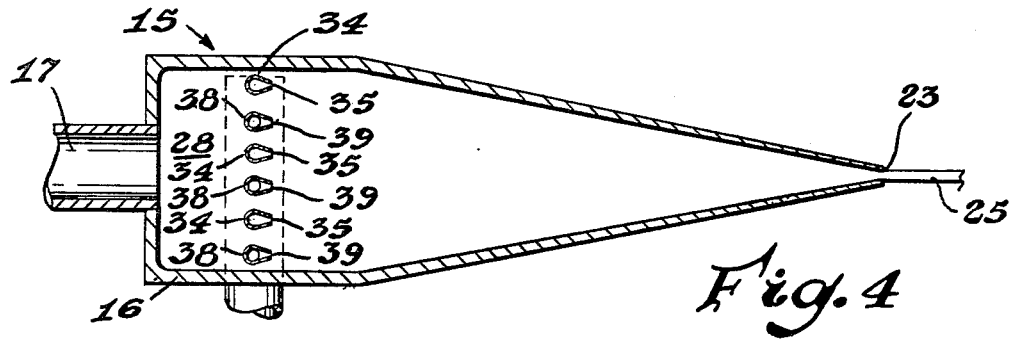
INVENTORS.
Peter Breidt, Jr.
Lloyd E. Lefevre
BY
ATTORNEY United States Patent Office 3,494,993
Patented Feb. 10, 1970

3,494,993
EXTRUSION OF WIDE THERMOPLASTIC FILM AND SHEET
Peter Breidt, Jr., Midland, and Lloyd E. Lefevre, Bay City, Mich., assignors to The Dow Chemical Company, Midland, Mich., a corporation of Delaware
Continuation-in-part of application Ser. No. 403,713, Oct. 14, 1964. This application Jan. 29, 1968, Ser. No. 743,262
Int. Cl. B29d 7/00
U.S. Cl. 264—166    11 Claims

ABSTRACT OF THE DISCLOSURE

Method for the preparation of foliated plastic sheet of thermoplastic resinous material is disclosed wherein the foliated sheet may be subsequently unfolded to provide a sheet having a width much greater than the die from which it was extruded.

---

This application is a continuation-in-part of our copending application Ser. No. 403,713, now abandoned filed Oct. 14, 1964.

This invention relates to the extrusion of wide thermoplastic resinous sheet, and more particularly relates to an improved method for the preparation of wide sheet.

For many applications, wide thermoplastic resinous sheet is desired. It is obtained by one of two methods. One method is by extruding such material is equipment having a die sufficiently large to generate a sheet of the desired width and a second method is the extrusion of a tube and stretching of the tube by means of internal gas pressure by the well known bubble process and subsequently slitting the tube to provide a sheet having a width equal to the circumference of the tube. Generally, equipment for the preparation of such wide sheets is very expensive, complicated and occupies much space.

It is an object of this invention to provide an improved method for the preparation of thermoplastic resinous sheets of relatively great width.

A further object of this invention is to provide a wide thermoplastic resinous sheet which is readily placed on a roll which is much narrower than the sheet itself.

Another object of this invention is to provide a method which would permit the extrusion of wide thermoplastic resinous sheet in a space which has a maximum dimension substantially less than the sheet being prepared.

Another object of this invention is to provide a unique laminated sheet which is readily unfolded to provide a sheet which has a width which is about an integral multiple of the extruded sheet.

These objects and other benefits and advantages of the present invention are achieved by the method of the present invention which comprises extruding a first stream of thermoplastic resinous material, the first stream having a first edge and a second edge, simultaneously extruding a plurality of minor streams within the first stream, each of the minor streams having a sheet-like configuration and being interdigitated with each other and alternatingly extending within the first stream from the first edge to a position adjacent the second edge and from the second edge to a position adjacent the first edge, the combined streams being formed into a generally sheet-like configuration and subsequently cooling below the thermoplastic temperature, the thermoplastic resinous material of the first stream being flexible and on cooling does not adhere strongly to the material of the minor streams.

The method of the invention is particularly adapted to be practiced by apparatus which comprises an extrusion die comprising a housing, the housing having a first or main passageway so constructed and arranged so as to permit streamline flow therein, the housing defining a first polymer entrance and an oppositely disposed slot-like extrusion orifice, means disposed within the passageway defining a plurality of generally parallel slot-like extrusion orifices, each extrusion orifice adapted to deliver a sheet-like stream of material into a material flowing within the first passageway, the extrusion orifices alternately extending from opposite walls of the passageway for a distance somewhat less than the total width of the passageway and the orifices being in interdigitating relationship.

The sheet in accordance with the present inventon comprises a flexible thermoplastic resinous sheet having disposed therein a plurality of poorly adhering lamina, the sheet having a first edge and a second edge, alternate lamina extending from the first edge toward the second edge, the remaining lamina extending from the second edge toward the first edge, the lamina being in generally parallel relationship and being interdigitated with each other.

Further features and advantages of the invention will become more apparent from the following specification when taken in connection with the drawing wherein:

FIGURE 1 schematically depicts the external configuration of an apparatus for practice of the method of the invention.

FIGURES 2, 3 and 4 are views of the apparatus of FIGURE 1.

FIGURE 5 is a schematic representation of a laminated sheet produced by the apparatus of FIGURES 1-4.

FIGURE 6 depicts a wide thermoplastic resinous flexible sheet prepared by the present invention.

Figure 2:
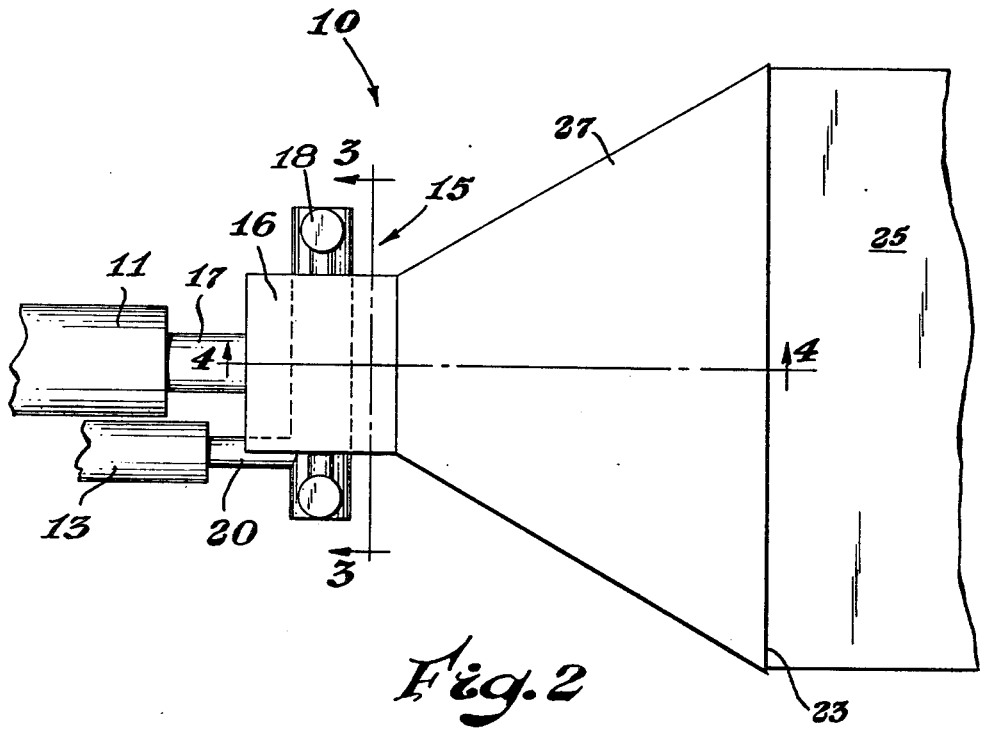
Figure 1:
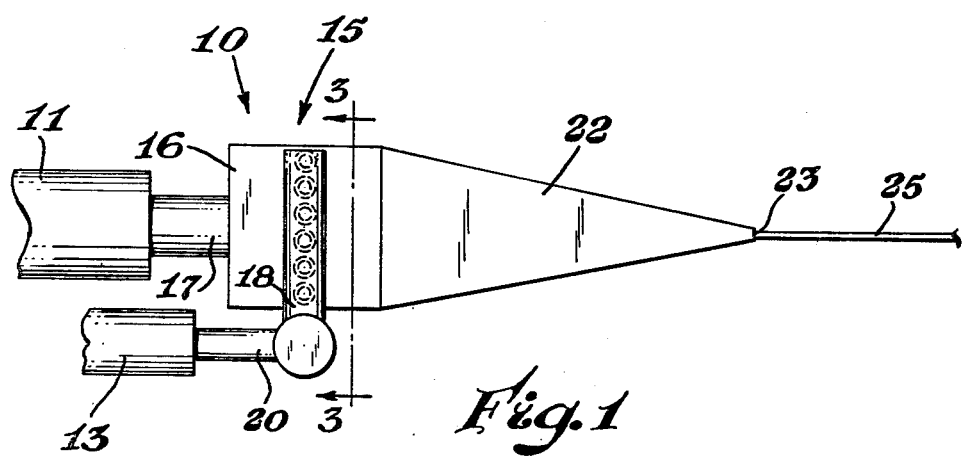

In FIGURES 1 and 2 there is schematically illustrated a view of apparatus for use in practice of the invention generally designated by the reference numeral 10. The apparatus 10 comprises in cooperative combination a first extruder 11, a second extruder 13 and a die assembly 15. The die assembly 15 comprises a housing 16, a conduit 17 adapted to receive heat plastified thermoplastic resinous material from the extruder 11 and transfer it to the body 16, a distribution manifold 18, a conduit 20 adapted to receive material from the extruder 13 and deliver it to the manifold 18. The housing 16 has a transition section 22 which terminates in an extrusion slot 23 from which issues a sheet 25. The internal configuration of the housing 16 and transition section 22 is such that streamline flow is permitted within.

FIGURE 3 is a sectional view of the housing 16 taken along the line 3—3 of FIGURES 1 and 2. The housing 16 defines an internal major passageway 28 having oppositely disposed sides or edges 29 and 30. The passageway 28 is so constructed and arranged so as to permit substantially streamline flow therein. The conduit 17 defines a passageway 32 which is in operative communication with the extruder 11 (not shown). A plurality of housings 34 each defining an extrusion orifice 35 are disposed within the passageway 28. The housings 34 are in communication with a leg 18a of the distribution manifold 18. Extrusion orifices 35 extend from the wall 29 and terminate adjacent the wall 30, thus providing an orifice or slot extending from one wall to a location close to the opposite wall. A plurality of housings 38 are interdigitated with the housings 34. Each of the housings 38 defines an extrusion orifice or slot 39. The slots 39 extend from the wall 30 to a position generally adjacent and spaced from the wall 29. Thus, the slots 35 and 39 alternately extend from opposite walls in an interdigitated manner.

FIGURE 4 is a view of the apparatus of FIGURES 1 and 2 taken along the line 4—4 of FIGURE 2 illustrating the generally parallel arrangements of the housings 34 and 38 within the passageway 28. Thermoplastic resinous material passing into the passageway 28 from the conduit 17 flows about the housings 34 and 38. Material forced into the housings 34 and 38 is distributed within the stream in the passageway 28 in a manner as illustrated by the end view configuration of the resultant sheet shown in exaggerated form in FIGURE 5. The schematic representation of FIGURE 5 depicts an end view of a sheet designated by the reference numeral 42. The sheet 42 comprises a flexible thermoplastic resinous body 44 having a first edge 45 and a second edge 46. Within the body 44 are a plurality of lamina 48 and a plurality of lamina 49. The lamina 48 extend from the edge 45 toward the edge 46 in generally parallel relationship, whereas the lamina 49 extend from the edge 46 toward the edge 45. The lamina 48 and 49 are generally parallel and are in interdigitated relationship. The lamina 48 and 49 are of a diverse material which is poorly adhered to the flexible thermoplastic resinous body 44.

FIGURE 6 is a sectional view of a wide sheet of thermoplastic resinous material prepared from the sheet 44 wherein a portion of the edge 45 designated as 45a has been separated from the adjacent lamina 48 and the entire body 44 stretched out to its maximum width.

Employing apparatus substantially as illustrated in FIGURES 1, 2, 3, 4 and 5, high pressure polyethylene having a melt index of 10 is co-extruded with polystyrene. Ten percent by weight solution of the polystyrene in toluene has a viscosity of about 20 centipoises at 25° C. The polyethylene is employed as the continuous phase; whereas, the polystyrene is the interdigitated discontinuous phase. The resultant sheet is 28" in width and has a total thickness of 34 mils. The polyethylene layers have a thickness of 4 mils, and the polystyrene layers a thickness of about 1 mil. On cooling of the sheet to room temperature, the polyethylene and polystyrene layers are readily separated to form a sheet substantially as illustrated in FIGURE 6, having a thickness of about 4 mils, and a width of about 194.5". Repeating the previous procedure, with the exception that a plasticized polyvinyl chloride is employed to replace the polyethylene, a wide polyvinyl chloride sheet is obtained having a width of about 194.5", a thickness of 4 mils. Similar results are obtained when the polystyrene of the foregoing illustrations is replaced with polymethyl methacrylate or ethyl cellulose.

What is claimed is:

1. A method of preparing a foliated sheet of thermoplastic resinous material which may be subsequently unfolded to provide a sheet wider than the die from which it is extruded, the steps of the method comprising extruding a heat plastified first stream having a first edge and a second edge, simultaneously extruding a plurality of minor streams within the first stream, each of the minor streams having a sheet-like configuration, the minor streams interdigitated with each other, the minor streams alternately extending within the first stream from the first edge to a position adjacent the second edge, and from the second edge to a position adjacent the first edge, forming the combined streams into a generally sheet-like configuration, and subsequently cooling the sheet-like configuration below the thermoplastic temperature, the thermoplastic resinous material of the first stream being flexible, and on cooling does not strongly adhere to the material of the minor streams, removing the material of the minor streams after the sheet-like configuration has cooled and the cooled sheet-like configuration being capable of being unfolded to form a sheet wider than the sheet-like configuration.

2. A method of preparing a foliated sheet which may be subsequently unfolded to form a wide thermoplastic resinous sheet wherein the resinous sheet has a width substantially greater than the die from which it is extruded and the foliated sheet, the steps of the method comprising extruding a first stream of a heat plastified synthetic resinous thermoplastic material into a configuration having a first edge and a second edge, simultaneously extruding a plurality of minor streams of a poorly adherent thermoplastic resinous material within the first stream, the minor streams alternately extending from the first edge of the first stream to a position adjacent to the second edge of the first stream and from the second edge of the first stream to a position adjacent the first edge of the first stream to form a composite main stream, deforming the composite main stream to form a sheet-like configuration wherein the minor streams have major faces generally parallel to a major face of the first stream, and cooling the composite stream to a temperature below the thermoplastic temperature of at least the material of the first stream, thereby obtaining a sheet which may be unfolded to form a sheet wider than the sheet-like configuration, and subsequently removing the material of the minor stream after the sheet-like configuration has cooled.

3. A method of preparing a foliated sheet of thermoplastic resinous material comprising extruding a heat plastified first stream having a first edge and a second edge, simultaneously extruding a plurality of minor streams within the first stream, each of the minor streams having a sheet-like configuration, the minor streams interdigitated with each other, the minor streams alternately extending within the first stream from the first edge to a position adjacent the second edge, and from the second edge to a position adjacent the first edge, forming the combined streams into a generally sheet-like configuration, and subsequently cooling the sheet-like configuration below the thermoplastic temperature, the thermoplastic resinous material of the first stream being flexible, and on cooling does not strongly adhere to the material of the minor streams, removing the material of the minor streams after the sheet-like configuration has cooled and unfolding the foliated sheet to form a broader sheet.

4. A method of preparing a wide thermoplastic resinous sheet wherein the sheet has a width substantially greater than the die from which it is extruded, comprising extruding a first stream of a heat plastified synthetic resinous thermoplastic material into a configuration having a first edge and a second edge, simultaneously extruding a plurality of minor streams of a poorly adherent thermoplastic resinous material within the first stream, the minor streams alternately extending from the edge of the first stream to a position adjacent to the second edge of the first stream and from the second edge of the first stream to a position adjacent the first edge of the first stream to form a composite main stream, deforming the composite main stream to form a sheet-like configuration wherein the minor streams have major faces generally parallel to a major face of the first stream, and cooling the composite stream to a temperature below the thermoplastic temperature of at least the material of the first stream, subsequently removing the material of the minor streams and unfolding the foliated sheet to form a broader sheet.

5. A method of preparing a foliated sheet of thermoplastic resinous material which can be subsequently unfolded to provide a sheet wider than the die from which it is extruded, the steps of the method comprising selecting first and second thermoplastic resinous materials which can be separated by peeling apart after simultaneous extrusion, extruding a heat plastified first stream of the first material having a first edge and a second edge, simultaneously extruding a plurality of minor streams of the second thermoplastic material within the first stream, each of the minor streams having a sheet-like configuration, the minor streams being interdigitated with each other, the minor streams alternately extending within the first stream from the first edge to a position adjacent the second edge, and from the second edge to a position adjacent the first edge, forming the combined streams into a generally sheet-like configuration, and subsequently cooling the sheet-like configuration below the thermoplastic temperature, the thermoplastic resinous material of the first stream being flexible, and one cooling does not strongly adhere to the material of the minor streams, and the cooled sheet-like configuration being capable of being unfolded without cutting to form a sheet which has a width which is about an integral multiple of that of the sheet-like configuration.

6. A method of preparing a foliated sheet which may be subsequently unfolded to form a wide thermoplastic resinous sheet wherein the resinous sheet has a width substantially greater than the die from which it is extruded and the foliated sheet, the steps of the method comprising selecting first and second thermoplastic resinous materials which, after simultaneous extrusion, can be separated by peeling apart, extruding a first stream of heat plastified first synthetic resinous thermoplastic material into a configuration having a first edge and a second edge, simultaneously extruding a plurality of minor streams of the second thermoplastic resinous material within the first stream, the minor streams alternately extending from the first edge of the first stream to a position adjacent to the second edge of the first stream and from the second edge of the first stream to a position adjacent the first edge of the first stream to form a composite main stream, deforming the composite main stream to form a sheet-like configuration wherein the minor streams have major faces generally parallel to a major face of the first stream, and cooling the composite stream to a temperature below the thermoplastic temperature of at least the material of the first stream, the thermoplastic resinous material of the first stream being flexible and on cooling does not strongly adhere to the material of the minor streams, thereby obtaining a sheet which may be unfolded without cutting or trimming to form a sheet having a width which is about an integral multiple of the width of the sheet-like configuration.

7. A method of preparing a foliated sheet of thermoplastic resinous material comprising extruding a heat plastified first stream having a first edge and a second edge, simultaneously extruding a plurality of minor streams within the first stream, each of the minor streams having a sheet-like configuration, the minor streams interdigitated with each other, the minor streams alternately extending within the first stream from the first edge to a position adjacent the second edge, and from the second edge to a position adjacent the first edge, forming the combined streams into a generally sheet-like configuration, and subsequently cooling the sheet-like configuration below the thermoplastic temperature, the thermoplastic resinous material of the first stream being flexible, and on cooling does not strongly adhere to the material of the minor streams, and unfolding the foliated sheet to form a broader sheet.

8. A method of preparing a wide thermoplastic resinous sheet wherein the sheet has a width substantially greater than the die from which it is extruded, comprising extruding a first stream of a heat plastified synthetic resinous thermoplastic material into a configuration having a first edge and a second edge, simultaneously extruding a plurality of minor streams of a poorly adherent thermoplastic resinous material within the first stream, the minor streams alternatively extending from the edge of the first stream to a position adjacent to the second edge of the first stream and from the second edge of the first stream to a position adjacent the first edge of the first stream to form a composite main stream, deforming the composite main stream to form a sheet-like configuration wherein the minor streams have major faces generally parallel to a major face of the first stream, and cooling the composite stream to a temperature below the thermoplastic temperature of at least the material of the first stream, the thermoplastic resinous material of the first stream being flexible and on cooling does not strongly adhere to the material of the minor streams, and subsequently unfolding the foliated sheet to form a broader sheet.

9. A method for preparing a foliated sheet which can subsequently be unfolded to form a wider thermoplastic resinous sheet wherein the resinous sheet has a width which is about an integral multiple of the width of the extruded foliated sheet, the steps of the method comprising extruding a first stream of heat plastified synthetic resinous thermoplastic material into a configuration having a first edge and a second edge, simultaneously extruding at least one minor stream of a poorly adherent thermoplastic resinous material within the first stream, at least one of the minor streams extending from the first edge of the first stream to a position adjacent the second edge of the first stream to form a composite main stream, deforming the composite main stream to form a sheet-like configuration wherein the minor stream has major faces generally parallel to a major face of the first stream, and cooling the composite stream to a temperature below the thermoplastic temperature of at least the material of the first stream, the thermoplastic resinous material of the first stream being flexible and on cooling does not strongly adhere to the material of the minor stream, thereby obtaining a sheet which can be unfolded without cutting or trimming to form a sheet having a width which is about an integral multiple of the width of the sheet-like configuration.

10. The method of claim 9 including the step of unfolding the cooled composite stream to provide a sheet having a width which is about an integral multiple of the width of the sheet-like configuration.

11. The method of claim 10 including the step of removing the material of the minor stream.

References Cited

UNITED STATES PATENTS

| 2,902,754 | 9/1959 | Lorenian | 264—171 |
| 2,985,556 | 5/1961 | Rowland | 264—171 |
| 3,213,808 | 10/1965 | Schafer | 18—13 |
| 3,227,103 | 1/1966 | Schafer | 18—13 |
| 3,268,970 | 8/1966 | Kelly et al. | 18—13 |

ROBERT F. WHITE, Primary Examiner

JEFFERY R. THURLOW, Assistant Examiner

U.S. Cl. X.R.

264—145, 171, 177, 210